May 7, 1968     E. L. SCHIAVONE     3,381,675
HIGH-FREQUENCY IGNITION SYSTEM
Filed Sept. 29, 1965
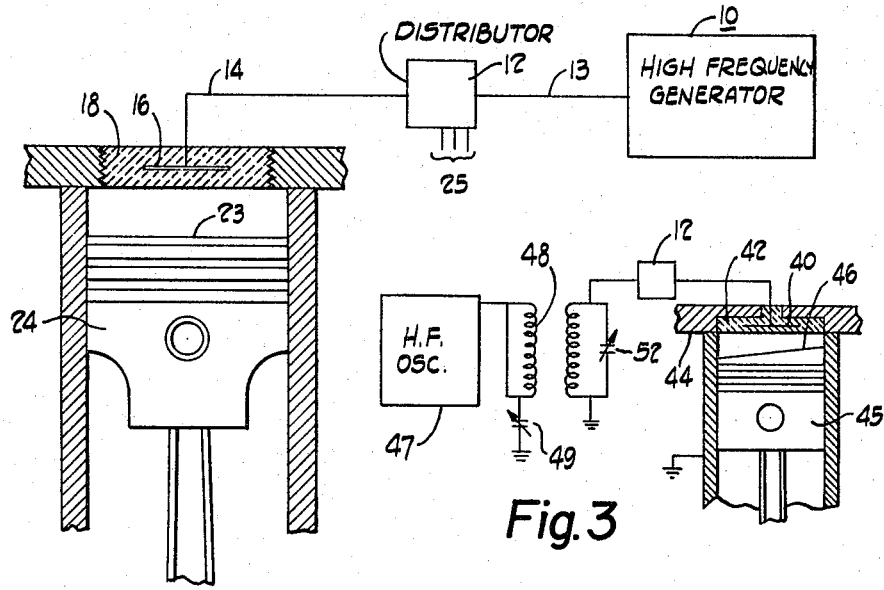
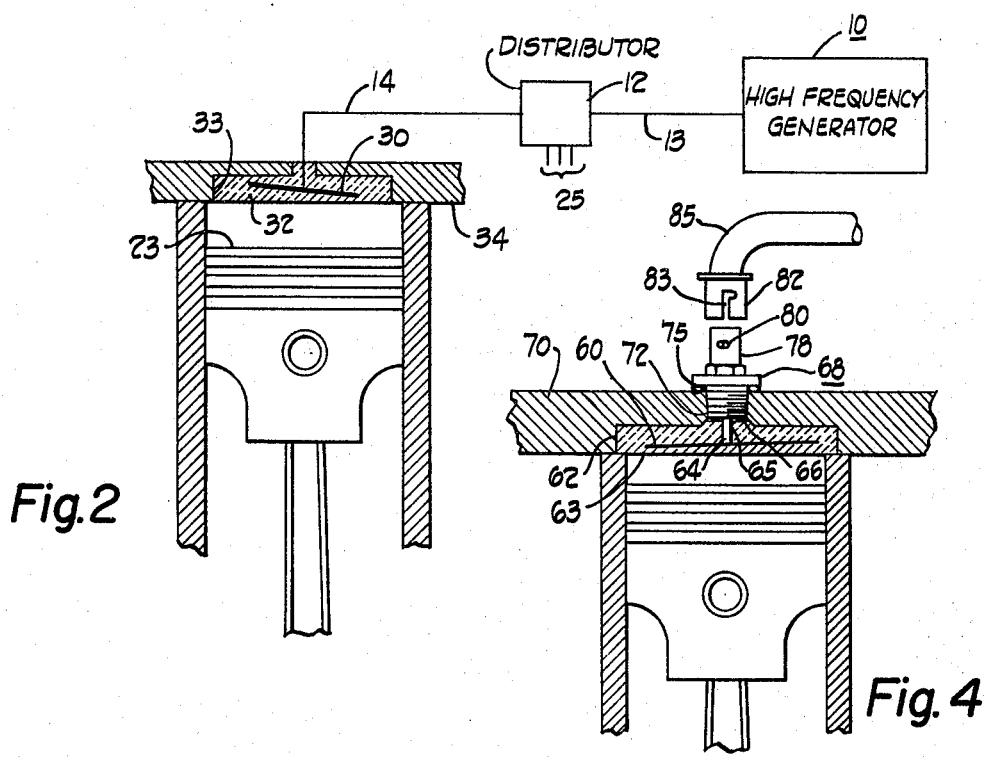
INVENTOR.
EDWARD L. SCHIAVONE
ATTORNEYS.

United States Patent Office 3,381,675
Patented May 7, 1968

3,381,675
HIGH-FREQUENCY IGNITION SYSTEM
Edward L. Schiavone, 10502 Insley St.,
Silver Spring, Md. 20902
Filed Sept. 29, 1965, Ser. No. 491,180
7 Claims. (Cl. 123—148)

ABSTRACT OF THE DISCLOSURE

This invention relates to an electronic ignition device for an internal combustion engine of the reciprocating piston type and more particularly to an ignition device which produces ignition by means of a high-frequency electrical field. The device includes a source of high voltage radio frequency energy and an electrode embedded in an insulating body positioned adjacent the end of the piston when the piston is in the forward end of its stroke. A conventional distributor controls the application of the high frequency energy to the electrode and to the piston. The high frequency electric field produced between the electrode and the piston produces ignition of the compressed fuel.

---

Accordingly, it is an object of this invention to provide an improved ignition device for an internal combustion engine.

It is another object of this invention to provide an ignition device for an internal combustion engine which will not be subject to fouling or changes in spacing.

Yet a further object of this invention is to provide an ignition system for an internal combustion engine which will work satisfactorily with low octane fuels.

A further object of this invention is to provide an ignition device which provides for controlled burning of the fuel in the combustion chamber.

Yet a further object of this invention is to provide an improved ignition device for an internal combustion engine which is simple and economical in construction, can be produced with a minimum of parts, requires a minimum of maintenance yet produces highly satisfactory ignition of fuels whether they be high octane or low octane.

Briefly in accordance with aspects of this invention, I employ in my novel ignition system, a high-frequency generator and an electrode embedded in an insulating block in the cylinder walls or the engine head to cooperate with a wall portion of the piston, both connected to the generator to produce an electric field which ignites the fuel. Preferably, a relatively flat planar electrode is connected to one terminal of the high frequency generator and another terminal is connected through the engine block to the piston. The electrode located in the cylinder wall or engine head acts as one electrode of a capacitor the other electrode being supplied by the adjacent portion of the piston. As the piston approaches the end of its stroke, corresponding to the point of maximum compression of the fuel, it also approaches the embedded electrode and the switching arrangement is such that the electric field is then applied between the electrode and the piston, thereby igniting the fuel. Alternatively, I provide a control system for varying the application of the electric field to the electrode within a few degrees of either side of the end of the piston stroke to produce a variable control for the ignition of the fuel.

In accordance with preferred embodiments of this invention, I employ a relatively flat planar electrode embedded in a solid mass of dielectric material and insert this mass of dielectric material in the cylinder head, to produce an angular relationship between a portion of the end wall of the piston and the electrode. Thus as the piston reaches the end of its compression stroke, the electrode and piston end wall are in close proximity and the electrode is a few degrees off the plane parallel to the end wall of the piston. With this relationship, the concentration of the radio field will be greatest at the point of closest proximity between the edge of the electrode and the edge of end wall of the piston. Thus discharge begins in this region of close proximity to ignite the fuel and the fuel will progressively burn in a direction of greater separation between the electrode and the piston. This angular relationship can be produced by employing pistons with relatively flat end walls perpendicular to the piston axis with electrodes mounted in the engine head at an angle relative to the piston end wall. Alternatively, the piston may be provided with an end wall portion disposed at an acute angle relative to the piston axis and the electrode may be mounted in a plane substantially perpendicular to the piston axis.

These and various other features and advantages of the invention will be more clearly understood from a reading of the detailed description of the invention in conjunction with the drawing in which:

FIGURE 1 is a schematic view, partly in section, showing illustrative embodiment of this ignition device;

FIGURE 2 is a schematic view, partly in section, of another embodiment of this invention;

FIGURE 3 is a schematic view, partly in section, of yet another embodiment of this invention; and FIGURE 4 is a fragmentary view in elevation, partly in section, showing details of one embodiment of this invention.

Referring now to FIGURE 1, a high frequency generator 10 is connected to a conventional distributor 12 by means of a conductor 13. This generator may include one of the transistorized ignition circuits shown and described in detail in Popular Electronics, June 1965, Ziff-Davis Publishing Company. These transistorized circuits develop output voltages of the order of 30 to 50 kv. This potential is sequentially connected through conductor 14 to a relatively flat planar electrode 16 embedded in a suitable disc of dielectric material 18, such as lava, porcelain or a ceramic material. The disc 18 is recessed in and threadably engages the cylinder head 20 mounted on an engine block 21 as indicated at 22. It is, of course, understood that while a threaded engagement of the disc 18 and the cylinder head 20 is indicated, other suitable forms of mounting and connecting the disc may be employed. The electrode 16 is preferably circular and forms one half of a capacitor in the circuit with the high frequency generator 10. The other half of the capacitor is formed by a flat end wall 23 of a conventional reciprocating piston 24. The end wall 23 of the piston 24 is substantially planar and, in this embodiment, substantially perpendicular to the piston axis and approaches the electrode 16 as the piston 24 approaches the end of its stroke. The exact instant of ignition is controlled by the distributor 12, which completes the circuit between the conductors 13, 14 by suitable means such as the conventional distributor arm. The distributor 12 is shown as having numerous other wires extending therefrom such as the wires 25 are connected to various other electrodes 16, one for each cylinder. Preferably, the engine block 21 is that of a two cycle or four cycle engine operating upon the "Otto" cycle. The frictional engagement between the piston 24 and the cylinder 21 produces sufficient electrical contact to complete the circuit from the generator 10, the conductor 26 and the piston 24 to the piston wall 23. The engine block 21 is, of course, provided with suitable intake and exhaust valves, not shown, in a manner well known in the art.

FIGURE 2 shows an alternative embodiment in which the distributor 12 is connected to the high frequency generator 10 and is connected through a wire 14 to a circular electrode 30 embedded in a suitable insulating block 32 and mounted within a circular recess 33 in the cylinder head 34. It is to be noted that the electrode 30 defines a relatively small acute angle with the top and bottom walls of the plug 32. More important, however, the electrode 30 defines a relatively small acute angle with the end wall 23 of the piston 24.

With this arrangement, the end wall 23 will more closely approach the right-hand side of the electrode 30 than the left-hand or remote side of end of its stroke. Thus the electric potential applied between the piston 24 and the electrode 30 will result in an electric field which is more concentrated between the end wall 23 and the area defining the right-hand portion of the electrode 30. The concentrated field will cause the fuel in this region to ignite first and to burn relatively slowly as the ignition zone expands toward the left-hand portion of the electrode 30, as viewed in FIGURE 2. As compared to the embodiment in FIGURE 1 where the ignition will be substantially uniform throughout the area between the end wall 23 and the electrode 16, the embodiment of FIGURE 2 which exhibits controlled burning is preferred.

Another embodiment is shown in combined block, schematic and fragmentary sectional form in FIGURE 3 in which a planar electrode 40 is embedded in a suitable block 42 of dielectric material with the circular planar surfaces of the electrode 40 parallel to the top and bottom walls of the dielectric block 42. The block 42 is recessed in the cylinder head 44 and the electrode 40 is connected through the distributor 12, to a high frequency oscillator 47 in a manner which will be subsequently described in detail. In the embodiment of FIGURE 3 the piston 45 is provided with an angularly disposed end wall 46 such that the electric field existing between the end wall 46 and the electrode 40 will be non-uniform in that it will be greater at the right-hand portion of the electrode 40 as viewed in FIGURE 3. Thus, the ignition of the fuel in that area will occur first.

In the embodiment of FIGURE 3, the output of the high frequency oscillator 47 is coupled to a series resonant circuit including a primary winding 48 and a variable capacitor 49. The series resonant circuit is coupled to a secondary winding 50 across which is coupled a variable trimmer capacitor 52. The transfer of electrical energy and the step-up in voltage from series to parallel resonant circuit takes place in accordance with well established electrical principles. The potential which is sequentially applied across electrode 40 and piston end wall 46 is of the order of 30 to 50 kv. The resulting electrical field ignites the compressed fuel.

Details of one embodiment are shown in FIGURE 4, which is a fragmentary view in elevation, partly in section, of a portion of the engine block and ignition system. In this particular embodiment, a relatively large circular electrode 60 is embedded in a ceramic lava, or other type of insulating disc 62 at a relatively small acute angle relative to the outer face 63. The electrode is provided with a centrally located connecting conductor 64 preferably terminating in a slotted sleeve 65 which frictionally engages the periphery of a pin 66. The pin 66 is insulated from and secured within a metal plug 68 which threadably engages a cylinder head 70 at 72. The plug 68 includes a cylindrical shoulder 74 which compresses a suitable lock washer 75 against the head 70 to prevent accidental rotation of plug 68. The plug 68 includes a cylindrical portion 78 with at least one pin 80 projecting radially therefrom. A cylindrical sleeve 82 (shown disconnected) is positioned to frictionally engage the periphery of portion 78 and includes a generally L shaped slot 83 to lockingly engage pin 80. An insulated cable 85 connects sleeve 82 to the distributor, not shown.

This invention has been described with reference to various embodiments and it is contemplated that various modifications and changes may be apparent to those skilled in the art and are within the scope of the present invention as defined by the appended claims. For example, the distributor 12 may be of the type which automatically adjusts the point of application of electric field to the electrodes for changes in fluid flow rate and/or engine speed.

What is claimed is:

1. In an internal combustion engine including an engine block, a cylinder head and at least one reciprocating piston in said block, the combination comprising a flat planar electrode mounted in an insulating body within the head of the engine, said electrode facing said piston and being covered by said insulating body, means connecting said electrode to a high frequency generator and means connecting said generator to the piston within said engine whereby an electrostatic field is created between the flat planar electrode and the piston, said field igniting the fuel between said piston and said electrode.

2. The combination according to claim 1 wherein said electrode lies in a plane substantially parallel to the end wall of the piston.

3. The combination according to claim 1 wherein said electrode lies in a plane substantially perpendicular to the line of thrust of the piston and wherein the piston is provided with an end wall forming an acute angle with the line of thrust.

4. In an internal combustion engine, the combination comprising:
   an engine block having a plurality of pistons, each reciprocating in an individual chamber;
   a head on said block;
   electrode means including a plurality of electrodes, each embedded in and covered by a mass of insulating material and each electrode positioned in said head in the path of one of said pistons; and,
   means for applying an electrical potential to said electrodes and to said piston to produce an electrostatic field therebetween, which field ignites fuel compressed therebetween.

5. The combination according to claim 4 wherein said electrodes are disposed at acute angles relative to the end walls of respective ones of said pistons.

6. The combination according to claim 5 wherein each of said pistons has an end wall substantially perpendicular to the piston axis and wherein said electrodes are disposed at acute angles relative to said axis.

7. The combination according to claim 4 wherein said means for applying an electrical potential includes a high frequency generator, a series resonant circuit coupled to said generator, a parallel resonant circuit coupled to said series resonant circuit and distributor means sequentially connecting said parallel resonant circuit to each of said electrodes.

References Cited
UNITED STATES PATENTS

| | | | |
|---|---|---|---|
| 2,093,848 | 9/1937 | Randolph et al. | 123—148 |
| 2,617,841 | 11/1952 | Linder | 123—148 |
| 2,844,135 | 7/1958 | Thayer | 123—148 |

LAURENCE M. GOODRIDGE, *Primary Examiner.*